Nov. 26, 1963   G. A. DOBSLAW   3,112,419
BEARING AND BRUSH RETAINER
Filed April 29, 1960
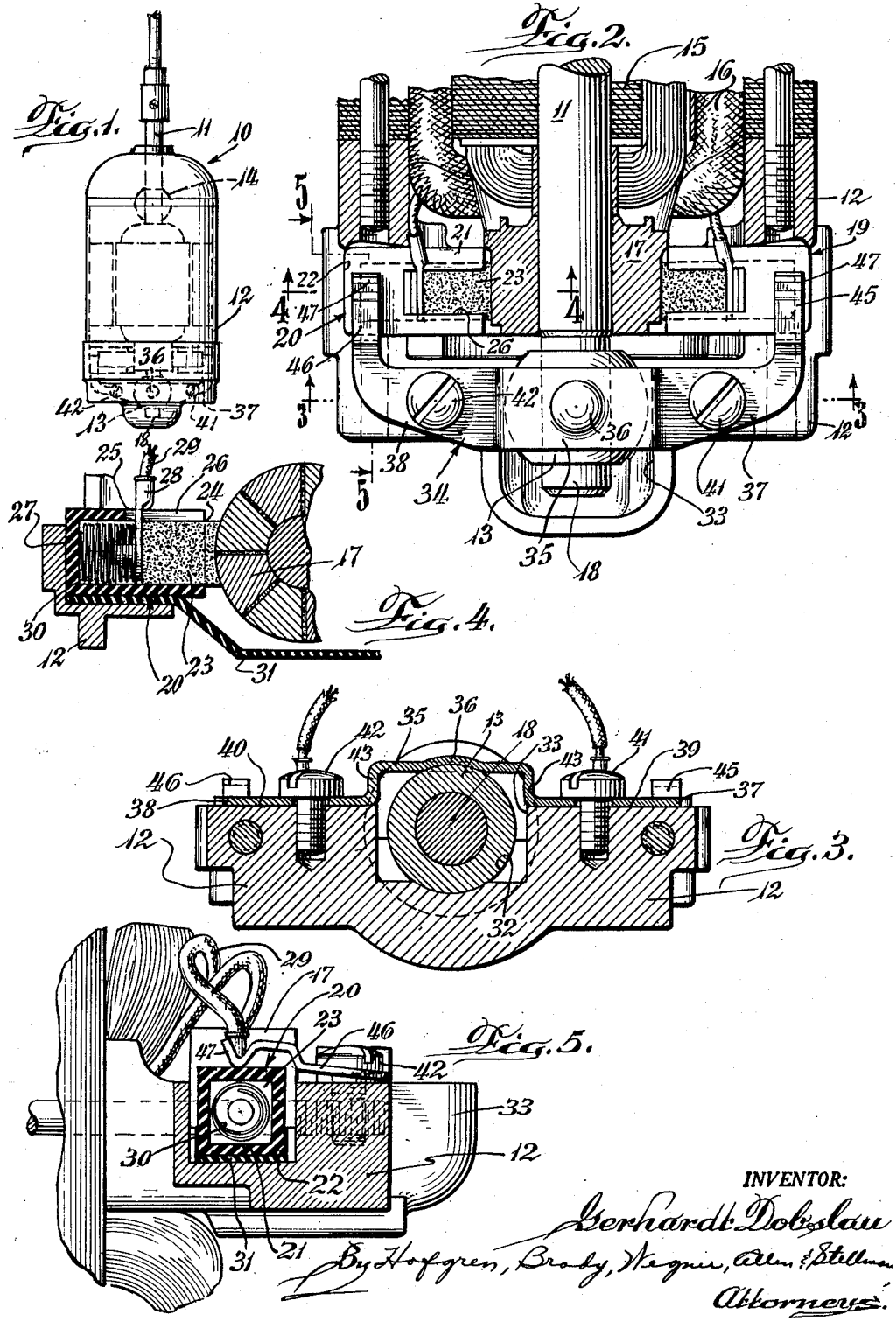
INVENTOR:
Gerhardt Dobslaw
By Hofgren, Brady, Wegner, Allen & Stellman
Attorneys 3,112,419
BEARING AND BRUSH RETAINER
Gerhardt A. Dobslaw, Park Forest, Ill., assignor to Portable Electric Tools, Inc., a corporation of Illinois
Filed Apr. 29, 1960, Ser. No. 25,615
4 Claims. (Cl. 310—239)

This invention relates to electric motors and in particular to structures for use in electric motors.

In the conventional electric motor, the rotatable armature shaft is journalled in bearings carried by the frame of the motor. To facilitate replacement of the bearings when desired, means may be provided for removably securing the bearings in the frame. Further, in certain conventional motors, cylindrical commutator structures may be provided on the shaft for co-operation with suitable brushes carried by the motor frame. Here again, to permit replacement of the brushes when desired, means may be provided for removably retaining the brushes in the motor frame. The present invention is concerned with the problem of retaining such bearing and brush devices in the motor frame and comprehends a new and improved structural combination directed thereto.

Thus, a prime object of the invention is to provide a new and improved electric motor structure.

Another object is to provide such a structure for retaining bearing and brush means of an electric motor in removable association with the motor.

A further object is to provide such a retaining means including a new and improved clip structure cooperating with each of the bearing means and brush means to effect readily removable retention thereof in the motor frame.

A still further object of the invention is to provide a new and improved brush device structure for co-operation with the retaining means for facilitated installation and removal thereof relative to the motor.

Still another object is to provide a new and improved bearing and retaining means arrangement providing facilitated installation and removal of the bearing relative to the motor and improved positive retention of the bearing in the motor frame.

Other features and advantages of the invention will be apparent from the following description taken in connection with the accompanying drawing wherein:

FIG. 1 is a plan view of an electric motor provided with structure embodying the invention;

FIG. 2 is a fragmentary enlarged diametric section thereof;

FIG. 3 is a transverse section taken substantially along the line 3—3 of FIG. 2;

FIG. 4 is a fragmentary transverse section taken substantially along the line 4—4 of FIG. 2; and FIG. 5 is a fragmentary section taken substantially along the line 5—5 of FIG. 2.

In the exemplary embodiment of the invention as disclosed in the drawing, an electric motor generally designated 10 includes a shaft 11 journalled in the frame 12 of the motor by means of a pair of bearings 13 and 14. Herein motor 10 includes an armature 15 fixed to the mid-portion of shaft 11 and suitable co-operating stator coils 16 fixed in frame 12. A conventional commutator 17 is fixed to shaft 11 adjacent a reduced diameter end 18 thereof journalled in bearing 13.

A pair of reversely similar brush devices 19 and 20 are mounted in frame 12 for engagement with commutator 17 at diametrically opposite portions thereof. Each brush device includes a hollow cage 21 slidably fitted in a recess 22 in frame 12. Recess 22 opens upwardly, as seen in FIG. 5, to permit ready insertion and removal of the brush device, and opens radially inwardly toward shaft 11 to permit a brush block 23 of the brush device to engage the commutator 17. The inner end 24 of the cage is open to permit the projection of the brush 23 therethrough and the upper wall 25 of the cage is provided with an opening 26 extending outwardly from cage end 24 to a point spaced inwardly from an outer wall 27 of the cage. A looped end 28 of an electrical conductor 29 extends into cage 21 through opening 26 to encircle a projection 29 extending outwardly from brush block 23 toward cage end 27. A coil spring 30 is arranged coaxially with projection 29 within the cage and is compressed between cage wall 27 and conductor end 28 urging the conductor end into positive electrical connection with brush block 23 and urging the brush block 23 into positive electrical contact with commutator 17. As best seen in FIG. 4, a formed insulation strip 31 extends across frame 12 under commutator 17 and between the brush device and the frame at the bottom of the recess 22.

In disclosing the structure of the brush devices 19 and 20, the description has been directed primarily toward the device 20; device 19 is allochirally similar to device 20 and thus the detailed description thereof is identical to the above description.

As best seen in FIGS. 2 and 3, bearing 13 comprises an exteriorly spherical sleeve member preferably formed of a suitable low friction bearing metal. The bearing is received slidably in a complementary segmentally spherical recess 32 in frame 12 extending downwardly in a cup-shaped well portion 33 at the end of the frame.

As indicated briefly above, the invention comprehends the provision of means for retaining each of the brush devices 19 and 20 and bearing 13 in its associated recess in frame 12. More specifically, the retaining means comprises a one-piece clip 34 having a mid-portion 35 provided with a segmentally spherical dimple 36 engaging the uppermost portion of bearing 13. As seen in FIG. 2, a first connecting portion 37 extends outwardly to the right from mid-portion 35, and a second connecting portion 38 extends outwardly to the left from mid-portion 35 to rest on upper surfaces 39 and 40 of frame 12 at the opposite sides of well 33. Connecting portion 37 is secured to frame 12 against surface 39 by suitable means such as screw 41 and clip portion 38 is secured to frame 12 at surface 40 by suitable means such as screw 42. Mid-portion 35 is connected at its opposite sides to connecting portions 37 and 38 by means of upstanding wall portions 43 whereby the flat plane of the mid-portion is raised somewhat above the flat plane of the connecting portions to dispose the mid-portion properly for receiving the upper portion of the bearing 13 within the dimple 36.

Referring now more specifically to FIGS. 2, 3 and 5, clip 34 further includes a pair of spring arms 44 and 45 extending from the outer ends of the connecting portions 37 and 38 respectively generally in the direction of extension of the shaft 11. Each arm includes a V-shaped end portion 47 yieldably engaging the upper cage wall 25 of the associated brush device to maintain the brush device in the frame recess. Thus, the generally U-shaped clip 34 serves to effect concurrent retention of each of bearings 13, brush device 19 and brush device 20 within its associated frame recess.

The installation and removal of brush devices 19 and 20 and bearing 13 are extremely simple. Assuming that clip 34 has not as yet been installed on frame 12, the brush devices are installed in their respective recesses in frame 12 by urging them downwardly thereinto with the brush blocks 23 confronting the commutator 17. The brush devices themselves are readily assembled by firstly placing the conductor end 28 in encircling association with projection 29 of the brush block and inserting this pre-assembled structure into the cage through cage end 24, coil spring 30 having been previously installed in the cage to receive the projection 29 coaxially. The upper opening 26 of the cage permits the conductor end 28 to move longitudinally therethrough to approximately the mid-portion of the cage slightly inwardly of the outer end of the opening when the brush block 23 is in engagement with the commutator 17 and the brush device is fully inserted into the recess. As wear of the brush block surface engaging the commutator occurs, spring 30 urges the brush block inwardly to maintain proper commutating engagement with the commutator at all times.

The bearing 13 is installed over the end 18 of shaft 11 and moved into recess 32. When the bearing is fully seated in the recess, the axis of shaft 11 is accurately centered in the stator 16 of the motor thereby assuring automatic accurate alignment of the motor elements. Clip 34 is now installed on the frame by means of screws 41 and 42 to have its mid-portion 35 overlie the bearing 13 and its arm end portions 47 engage the upper wall 25 of the brush device cages to retain concurrently the bearing in recess 32 and the brush devices in recesses 22.

To remove either of the brush devices or the bearing 13 when desired, clip 34 is disassociated from frame 12 by removing screws 41 and 42, providing complete free accessibility to the brush devices and/or the bearing for removal as desired.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In an electric motor having a shaft and an element on the shaft to be engaged by a pair of brushes, the combination comprising: a frame having a pair of spaced recesses oppositely adjacent the element to be engaged by the brushes and opening outwardly in one direction from the frame, and a third recess adjacent the shaft generally between said pair of recesses and opening outwardly in said direction; a pair of brushes fitted one each in the pair of recesses to engage the element; a bearing fitted in the third recess to carry the shaft; and a clip formed of thin resilient material and having a pair of connecting portions removably secured to the frame at opposite sides of said third recess, a pair of arms overlying each of said pair of recesses for retaining the brushes against movement outwardly therefrom, and another portion between said connecting portions overlying said third recess for retaining the bearing against movement outwardly therefrom.

2. The combination of claim 1 wherein said mid-portion comprises a U-shaped portion opening toward said third recess and having a bight spaced substantially outwardly from the connecting portions to engage said bearing only at a mid-portion of the bight.

3. The combination of claim 2 wherein said bight is provided with an inwardly opening dimple spaced intermediate said connecting portions.

4. The combination of claim 1 wherein each arm includes a V-shaped distal end portion opening away from the subjacent brush.

References Cited in the file of this patent

UNITED STATES PATENTS

| 2,285,970 | Hemphill | June 9, 1942 |
| 2,798,979 | Ernst | July 9, 1957 |
| 2,883,567 | Schneider | Apr. 21, 1959 |

FOREIGN PATENTS

| 648,055 | France | Aug. 7, 1928 |